United States Patent
Zhang

(10) Patent No.: US 8,244,823 B2
(45) Date of Patent: Aug. 14, 2012

(54) METHOD, SYSTEM, SERVER AND USER EQUIPMENT FOR OBTAINING DEFAULT NOTIFICATION MESSAGE

(75) Inventor: Jie Zhang, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 321 days.

(21) Appl. No.: 12/345,028

(22) Filed: Dec. 29, 2008

(65) Prior Publication Data

US 2009/0113013 A1 Apr. 30, 2009

Related U.S. Application Data

(63) Continuation of application No. PCT/CN2007/070569, filed on Aug. 27, 2007.

(30) Foreign Application Priority Data

Sep. 15, 2006 (CN) .......................... 2006 1 0153987

(51) Int. Cl.
*G06F 15/16* (2006.01)

(52) U.S. Cl. ............. 709/207; 725/62; 725/81; 725/101

(58) Field of Classification Search .................. 709/207; 725/62, 81, 101
See application file for complete search history.

(56) References Cited

U.S. PATENT DOCUMENTS

| | | | |
|---|---|---|---|
| 7,584,495 B2 * | 9/2009 | Hannuksela et al. | ......... 725/101 |
| 7,614,068 B2 * | 11/2009 | Jansky | ............................. 725/54 |
| 7,801,513 B2 * | 9/2010 | Jung et al. | ................. 455/414.2 |
| 2006/0053450 A1 * | 3/2006 | Saarikivi et al. | ................. 725/46 |
| 2006/0218586 A1 * | 9/2006 | Pohjolainen et al. | ........... 725/39 |
| 2006/0253544 A1 * | 11/2006 | Luoma et al. | ................. 709/217 |
| 2006/0265728 A1 * | 11/2006 | Vare et al. | ........................ 725/81 |
| 2007/0041377 A1 * | 2/2007 | Song et al. | .................... 370/389 |
| 2007/0207727 A1 * | 9/2007 | Song et al. | ................... 455/3.06 |
| 2008/0040761 A1 * | 2/2008 | Xu et al. | ....................... 725/105 |

(Continued)

FOREIGN PATENT DOCUMENTS

CN 1246763 A 3/2000

(Continued)

OTHER PUBLICATIONS

International Search Report issued in corresponding PCT Application PCT/CN2007/070569; mailed Dec. 13, 2007.

(Continued)

*Primary Examiner* — Duyen Doan
(74) *Attorney, Agent, or Firm* — Brinks Hofer Gilson & Lione

(57) ABSTRACT

The present disclosure discloses a method, server, and UE, to be applied to a DVB-H system, for obtaining a default notification message. The method includes obtaining a data structure carrying a unique default notification access parameter corresponding to a default notification message, obtaining the default notification access parameter from the data structure, and obtaining the default notification message at the location indicated by the default notification access parameter. The method provided by the disclosure may enable a UE to obtain the unique default notification access parameter in a DVB-H system and obtain the default notification message based on the default notification access parameter. Moreover, because the default notification access parameter obtained by the UE is unique, the disclosure overcomes the problem in the prior art that default notification session access parameters may be inconsistent and no data redundancy will be caused in the UE.

11 Claims, 7 Drawing Sheets

U.S. PATENT DOCUMENTS

| | | | |
|---|---|---|---|
| 2008/0045251 A1* | 2/2008 | Jeon et al. | 455/466 |
| 2008/0092163 A1* | 4/2008 | Song et al. | 725/39 |
| 2009/0240767 A1* | 9/2009 | Zhang | 709/203 |
| 2010/0105314 A1 | 4/2010 | Paila et al. | |

FOREIGN PATENT DOCUMENTS

| | | |
|---|---|---|
| CN | 1669268 A | 9/2005 |
| EP | 1 104 128 A1 | 5/2001 |
| EP | 1 617 666 A2 | 1/2006 |
| GB | 2 390 785 | 1/2004 |
| WO | 2004/112368 A | 12/2004 |

OTHER PUBLICATIONS

International Preliminary Report of Patentability issued in corresponding PCT Application No. PCT/CN2007/070569; issued Mar. 17, 2009.

Office Action issued in corresponding Chinese Patent Application No. 200610153987.6; issued Apr. 13, 2010.

Office Action issued in corresponding European Patent Application No. 07 785 466.9; issued Jul. 30, 2009.

Summons to Attend Oral Proceedings issued in corresponding European Patent Application No. 07 785 466.9; issued May 3, 2010.

Jung, Bosun et al. "Notification Section for TS Service Guide" URL:http://memeber.openmobilealliance.org/ftp/Public_documents/bcast /2005/OMA-BCAST-2005-0413-Notification-Section-for-TS-Service-Guide.zip>; Retrieved Jun. 24, 2009.

"Digital Video Broadcasting (DVD); IP Datacast over DVB-H: Electronic Service Guide (ESG)" European Broadcasting Union. Cedex, France vol. BC , No. V1.1.1; Apr. 1, 2006.

Supplementary European Search Report issued in corresponding European Patent Application No. 07 78 5466; mailed Jul. 14, 2009.

Office Action issued in corresponding Chinese Patent Application No. 200610153987.6, mailed Oct. 31, 2011.

Office Action issued in corresponding European Patent Application No. 07785466.9, mailed Jan. 20, 2011.

Minutes of Oral Proceedings issued in corresponding European Patent Application No. 07785466.9, mailed Jan. 20, 2011.

ETSI, "IP Datacast Over DVB-H: Notification" ETSI TS 1XX XXX, V0.0.5, Jul. 2006—DRAFT.

* cited by examiner

METHOD, SYSTEM, SERVER AND USER EQUIPMENT FOR OBTAINING DEFAULT NOTIFICATION MESSAGE

CROSS REFERENCES TO RELATED APPLICATIONS

This application is a continuation application of PCT/CN2007/070569, filed Aug. 27, 2007 which claims priority to the Chinese Patent Application No. 200610153987.6, filed with the Chinese Patent Office on Sep. 15, 2006 and entitled "Method, System Server and User Equipment for Obtaining Default Notification Message", the contents of which are incorporated herein by reference in their entirety.

FIELD OF THE DISCLOSURE

The disclosure relates to the communication field, and in particular, to a method, system, server, and User Equipment (UE) for obtaining a default notification message.

BACKGROUND OF THE DISCLOSURE

Along with the development of communication technologies, multimedia communications are becoming more and more popular. Using a UE, a user can make data communications with a multimedia communication system so as to enjoy more and more multimedia services provided by the multimedia communication system, such as mobile broadcasting services including Digital Video Broadcasting Handheld (DVB-H) service.

Among the available mobile broadcasting services, notification is a very important function, used to notify a UE of some forthcoming events, such as emergencies and events related to the program content. In terms of service operation, the notification function includes a default notification service, an associated notification service, and an independent notification service. Herein, a service provider (also referred to as an IT platform) hopes that all UEs can receive a default notification involved in the default notification service. In particular, the general method for receiving a default notification is includes a UE obtaining a default notification access parameter from the service provider and obtaining a corresponding default notification message at a location specified by the default notification access parameter. For example, the location indicated by the default notification access parameter is a destination Internet Protocol (IP) port number to which the default notification message is sent, and when a default notification message is sent to the destination IP port number, the UE intercepts the default notification message.

Although the DVB-H system is more and more mature, the system has not provided a specific method for obtaining a default notification message. In contrast, the current BCAST system provides a specific method for obtaining a default notification message, the operating principle of which is shown in FIG. 1.

FIG. 1 is a schematic diagram showing the method of the prior art for obtaining a default notification message. In FIG. 1, a server puts an Electronic Program Guide (EPG) send descriptor into an EPG notification session and cyclically broadcasts the session. The EPG send descriptor includes a descriptor entry that specifies the location of the EPG send session and a default notification access parameter that indicates the location of the default notification session. As shown in FIG. 1, multiple default notification messages can be transmitted in a default notification session. When a UE receives the EPG notification session cyclically broadcasted by the server, the UE reads the default notification access parameter included in the EPG notification session, obtains the default notification session at the location indicated by the default notification access parameter, and thus retrieves all default notification messages in the default notification session.

Although the specific method for obtaining a default notification message provided by the BCAST protocol enables a UE to obtain the default notification message, there are the following issues:

1. A service provider usually provides only one default notification service. That is, there is only one default notification session. This requires that the default notification access parameters included in all EPG send descriptors sent to a UE should be consistent so that all the default notification access parameters correspond to the default notification messages covered by a same default notification service. However, there might be more than one EPG send descriptor in an EPG notification session, and different EPG providers may provide different EPG send descriptors. Therefore, it cannot be guaranteed that multiple default notification access parameters in all EPG send descriptors are consistent. As a result, after a UE reads a/some default notification access parameter(s) included in an EPG notification session, the UE cannot obtain the default notification message included in the default notification session at the location indicated by the default notification access parameter(s).

2. An EPG notification session may carry more than one EPG send descriptor, and a UE will receive all the EPGs provided by multiple EPG providers which will cause a rather serious data redundancy inside the UE.

3. The method illustrated in FIG. 1 for obtaining a default notification message is applied to the BCAST system. The method cannot be applied to the DVB-H system directly so the DVB-H system still cannot provide a specific method for obtaining a default notification message.

Therefore, the prior method cannot enable a UE to obtain a default notification message in the DVB-H system.

SUMMARY OF THE DISCLOSURE

An embodiment of the present disclosure provides a method for obtaining a default notification message so that a UE can obtain the default notification message in a DVB-H system.

Another embodiment of the present disclosure provides a server and UE for obtaining a default notification message so that a UE can obtain the default notification message in a DVB-H system.

To achieve the above objectives, the technical solution of the embodiments of the present disclosure is implemented as described below.

An embodiment of the present disclosure discloses a method for obtaining a default notification message where the method is applied in a DVB-H system and includes obtaining a data structure which carries a unique default notification access parameter corresponding to a default notification message, parsing out the default notification access parameter from the data structure, and obtaining the default notification message at a location indicated by the default notification access parameter.

Another embodiment of the present disclosure discloses a server for obtaining a default notification message. The server includes a parameter insertion unit adapted to insert a unique default notification access parameter corresponding to a default notification message into a data structure and send the data structure to a server transceiver unit. The server transceiver unit is adapted to send the data structure, which is received from the parameter insertion unit, to a UE.

Another embodiment of the present disclosure discloses a UE for obtaining a default notification message. The UE includes a UE transceiver unit adapted to obtain a data structure which carries a unique default notification access parameter corresponding to a default notification message and send the data structure to a parameter parsing unit. The parameter parsing unit is adapted to parse out the default notification access parameter from the data structure received from the UE transceiver unit and obtain the default notification message according to the default notification access parameter.

Another embodiment of the present disclosure discloses a system for obtaining a default notification message. The system includes a server adapted to put a unique default notification access parameter corresponding to a default notification message into a data structure and send the data structure to a UE. The UE is adapted to receive the data structure, obtain the default notification access parameter from the data structure, and obtain the default notification message at a location indicated by the default notification access parameter.

According to the method, server, UE, and system disclosed by the embodiments of the present disclosure for obtaining a default notification message and applied to a DVB-H system, a unique default notification access parameter corresponding to a default notification message is carried in a data structure. The data structure corresponds to the default notification service and is sent to a UE. The UE receives the data structure and obtains the default notification access parameter from the data structure. Therefore, compared with the prior art, the embodiments of the present disclosure solve the problem that not all EPG send descriptors can be guaranteed to correspond to the default notification service when there are multiple EPG providers.

The embodiments of the present disclosure enable a UE to successfully obtain a unique default notification access parameter in a DVB-H system and to obtain a default notification message according to the default notification access parameter. Moreover, because the access parameter obtained by the UE is unique, the embodiments overcome the problem that the default notification access parameters are inconsistent due to the inability of guaranteeing all EPG descriptors to correspond to the default notification service in the prior art and no data redundancy will be caused in the UE.

DETAILED DESCRIPTION OF THE DISCLOSURE

The present disclosure will be described in detail with reference to the drawings and specific embodiments hereunder.

The method for obtaining a default notification message provided by an embodiment of the present disclosure is applied to a DVB-H system where a default notification access parameter corresponding to a default notification message is carried in a data structure, and the data structure corresponds to a default notification service and is sent to a UE. The UE receives the data structure, obtains the default notification access parameter carried in the data structure, and obtains the default notification message at a location indicated by the default notification access parameter.

The server for obtaining a default notification message provided by an embodiment of the present disclosure includes a parameter insertion unit connected to a server transceiver unit where the parameter insertion unit is adapted to put a default notification access parameter corresponding to a default notification message into a data structure which corresponds to a default notification service and to send the data structure to the server transceiver unit. The server transceiver unit is adapted to send the data structure received from the parameter insertion unit to a UE.

The UE for obtaining a default notification message provided by an embodiment of the present disclosure includes a parameter parsing unit connected to a UE transceiver unit where the UE transceiver unit is adapted to receive from a server a data structure that carries a default notification access parameter and corresponds to a default notification service and send the data structure to the parameter parsing unit. The parameter parsing unit is adapted to parse out the default notification access parameter from the data structure received from the UE transceiver unit and obtaining the default notification message at a location indicated by the default notification access parameter.

Figure 1:
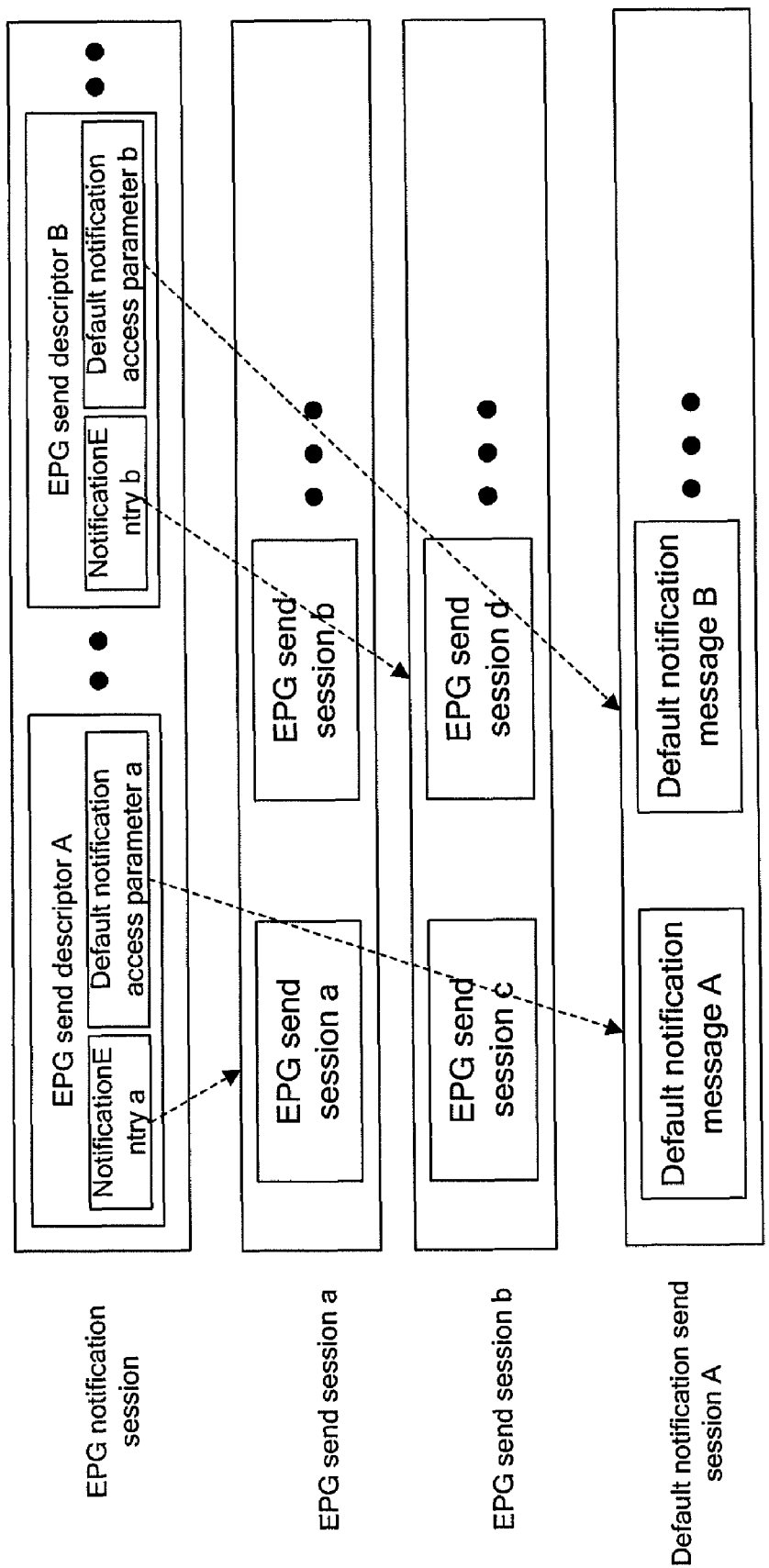
FIG. 1 is a schematic diagram illustrating the method of the conventional art for obtaining a default notification message.
Figure 2:
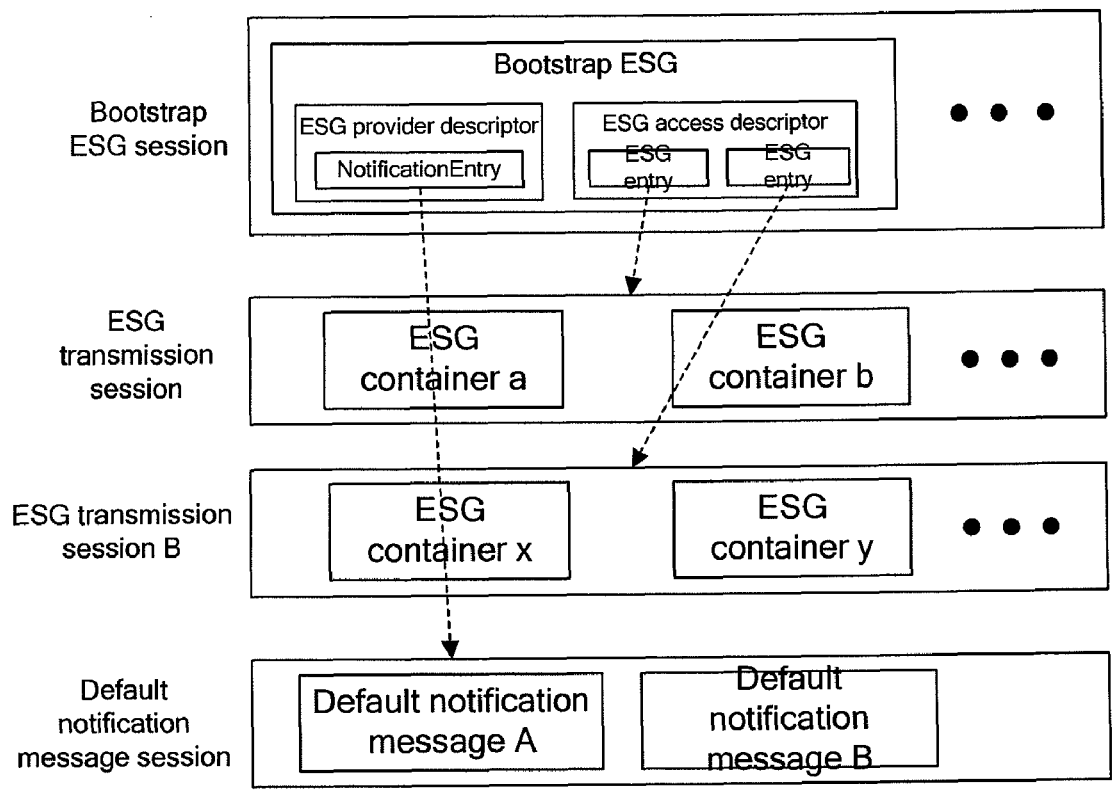
FIG. 2 is a schematic diagram for obtaining a default notification message in accordance with a first embodiment of the present disclosure.

FIG. 2 is a schematic diagram for obtaining a default notification message according to a first embodiment of the present disclosure. In FIG. 2, a bootstrap Electronic Service Guide (ESG) session carries a bootstrap ESG The bootstrap ESG carries an ESG provider descriptor and an ESG access descriptor, and the ESG access descriptor carries an ESG entry. The ESG entry specifies the location of an ESG transmission session which includes multiple ESG containers. Based on this, a server may further carry a unique default NotificationEntry in the ESG provider descriptor of the bootstrap ESG. Actually, the NotificationEntry is a data format that can be carried by the ESG provider descriptor, and the specific data content embodied by the NotificationEntry is a default notification access parameter.

The general data structure of the NotificationEntry is shown in Table 1:

TABLE 1

| Parameter | Data Type | Meaning |
| --- | --- | --- |
| NotificationEntry{ | | |
| NotificationAccessPort | Integer | Indicates the IP port number used for sending a default notification message. |
| NotificationAccessAddress | Character string | Indicates the IP multicast address used for sending the default notification message. |
| NotificationRequestAccessURL | Character string | According to this location information, the UE can obtain the notification message through the Internet. |
| } | | |

When the NotificationEntry is carried in the ESG provider descriptor, the server broadcasts the bootstrap ESG. The specific broadcasting mode is generally: cyclically broadcasting the bootstrap ESG at the address well known by the server and the UE. Generally, the address well known by the server and the UE is called a well known address. Besides broadcasting the bootstrap ESG which carries the NotificationEntry, the server also inserts the Program Specific Information/Specific Information (PSI/SI) table information containing an Internet Protocol/Medium Access Control Notification Table (INT) into a Transition Stream (TS) and broadcasts the TS.

When receiving the PSI/SI table information from the server, the UE may find, in the PSI/SI table information, the INT corresponding to the BCAST service provider selected by the user by using the conventional art. Moreover, the UE may also obtain an Elementary Stream (ES) that transmits the bootstrap ESG at the well know address according to the INT by using the conventional art.

After receiving the ES stream, the UE can obtain all descriptors of the bootstrap ESG from the ES, read the NotificationEntry from the ESG provider descriptor, and obtain from the NotificationEntry the default notification access parameter which is taken as the data content.

So far, the UE has successfully obtained the default notification access parameter and can obtain a default notification message at the location indicated by the default notification access parameter. Generally, the default notification access parameter is an IP address and port number used when the server broadcasts a default notification message. The specific method for obtaining a default notification message may be that the UE monitors messages sent to the IP address which is set to be the default notification access parameter, and when a default notification message is sent to the IP address, the UE intercepts the default notification message.

Figure 3:
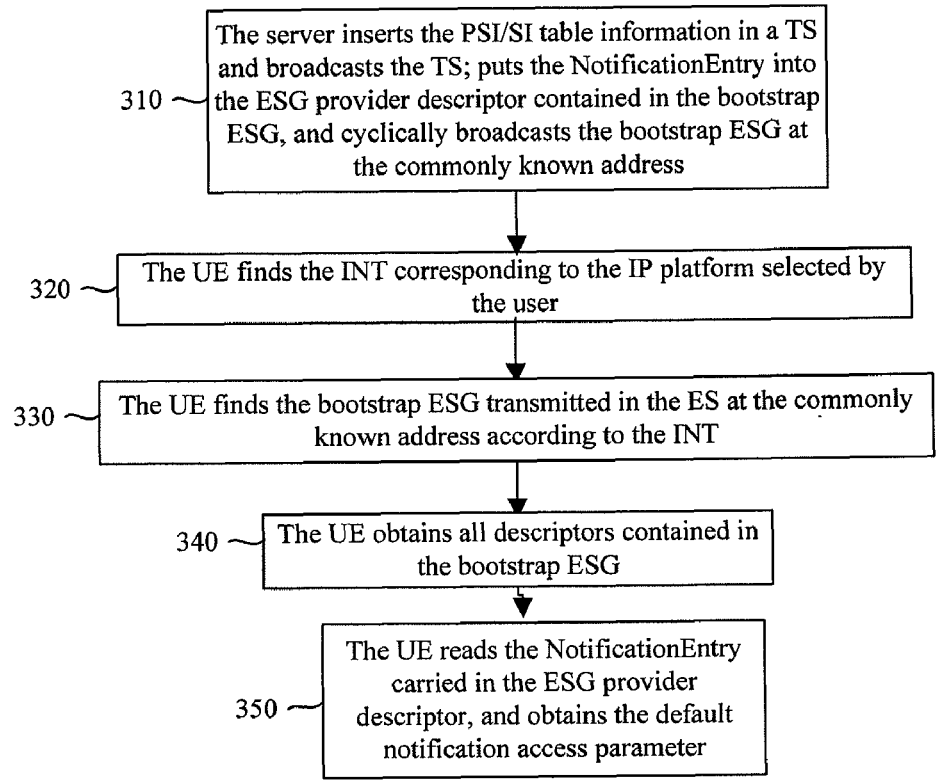
FIG. 3 is a flowchart corresponding to the principle illustrated in FIG. 2.

From the description above, it can be seen that the procedure corresponding to the principle shown by FIG. 2 can be illustrated by FIG. 3. The procedure illustrated by FIG. 3 includes the following Blocks:

Block 310: The server inserts the PSI/SI table information which contains an INT into a TS and broadcasts the TS. The server also puts a NotificationEntry into the ESG provider descriptor included in the bootstrap ESG and cyclically broadcasts the bootstrap ESG at the well know address.

Block 320: The UE finds, in the PSI/SI table information received from the server, the INT corresponding to the BCAST service provider selected by the user.

Block 330: The UE finds the bootstrap ESG transmitted in the ES at the well know address according to the INT.

Block 340: The UE obtains all descriptors of the bootstrap ESG in the ES.

Block 350: The UE reads the NotificationEntry in the ESG provider descriptor among the descriptors and then can obtain the default notification message at the location indicated by the NotificationEntry.

In the above description of FIG. 2 and FIG. 3, the NotificationEntry is carried in the ESG provider descriptor which is included in the bootstrap ESG. In practice, the NotificationEntry may also be carried in a default notification discovery descriptor that is newly added to the bootstrap ESC, and thus the UE can be ensured to obtain the NotificationEntry and then obtain the default notification message. The principle of the foregoing method for obtaining the default notification message is illustrated by FIG. 4.

Figure 4:
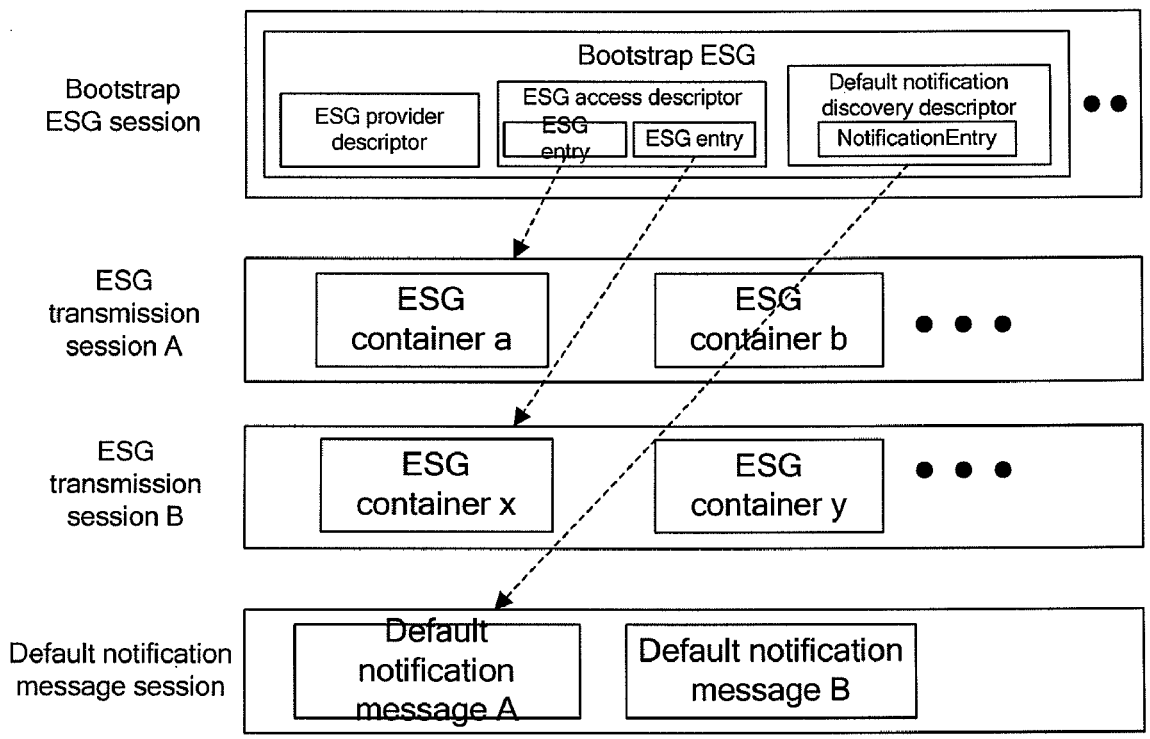
FIG. 4 is a schematic diagram for obtaining a default notification message in accordance with a second embodiment of the present disclosure.

In FIG. 4, the bootstrap ESG session carries the bootstrap ESG. The bootstrap ESG usually carries the ESG provider descriptor and ESG access descriptor, and the ESG access descriptor carries the ESG entry. Based on this, the server may further carry the default notification discovery descriptor in the bootstrap ESG and carry a unique NotificationEntry in the default notification discovery descriptor.

After the NotificationEntry is carried in the default notification discovery descriptor that is newly added to the bootstrap ESQ the server broadcasts the bootstrap ESG. The specific broadcasting mode is generally: cyclically broadcasting the bootstrap ESG at the well known address. Besides broadcasting the bootstrap ESG which carries the NotificationEntry, the server also inserts PSI/SI table information containing an INT into a TS and broadcasts the TS.

After receiving the PSI/SI table information from the server, the UE may find, in the PSI/SI table information, the INT corresponding to the BCAST service provider selected by the user by using the conventional art. Moreover, the UE may also obtain the bootstrap ESG transmitted in the ES at the well known address according to the INT by using the conventional art.

After receiving the ES, the UE can obtain all descriptors of the bootstrap ESG from the ES, read the NotificationEntry from the default notification discovery descriptor, and obtain from the NotificationEntry the default notification access parameter which is taken as the data content.

So far, the UE has successfully obtained the default notification access parameter and may obtain a default notification message at the location indicated by the default notification access parameter. The specific method for obtaining the default notification message is the same as that illustrated with reference to FIG. 2.

Figure 5:
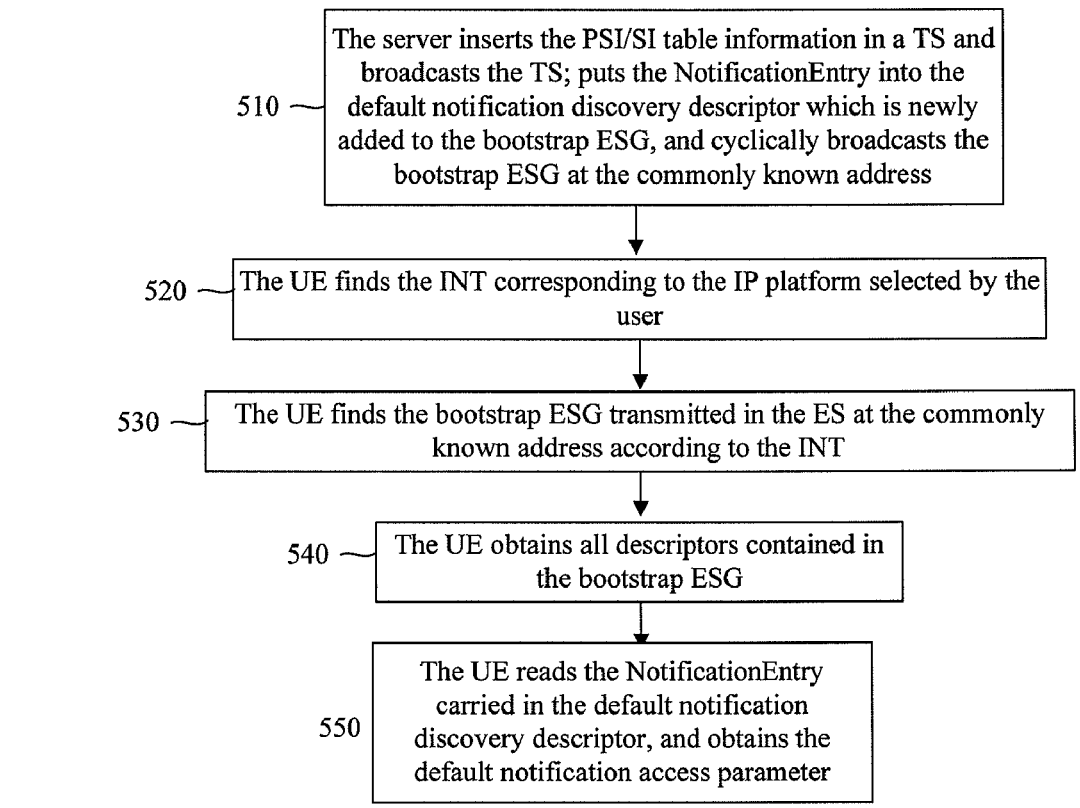
FIG. 5 is a flowchart corresponding to the principle illustrated in FIG. 4.

It can be seen from the above description that the procedure corresponding to the principle shown in FIG. 4 may be illustrated by FIG. 5. The procedure shown in FIG. 5 includes the following Blocks:

Block 510: The server inserts the PSI/SI table information which contains an INT into a TS and broadcasts the TS. The server also puts the NotificationEntry into the default notification discovery descriptor which is newly added to the bootstrap ESG and cyclically broadcasts the bootstrap ESG at the well known address.

Block 520: The UE finds, in the PSI/SI table information received from the server, the INT corresponding to the BCAST service provider selected by the user.

Block 530: The UE finds the ES that transmits the bootstrap ESG at the well known address according to the INT.

Block 540: The UE obtains all descriptors of the bootstrap ESG transmitted in the ES.

Block 550: The UE reads the NotificationEntry from the default notification discovery descriptor among the descriptors and may further obtain the corresponding default notification message at the location indicated by the NotificationEntry.

Figure 6:
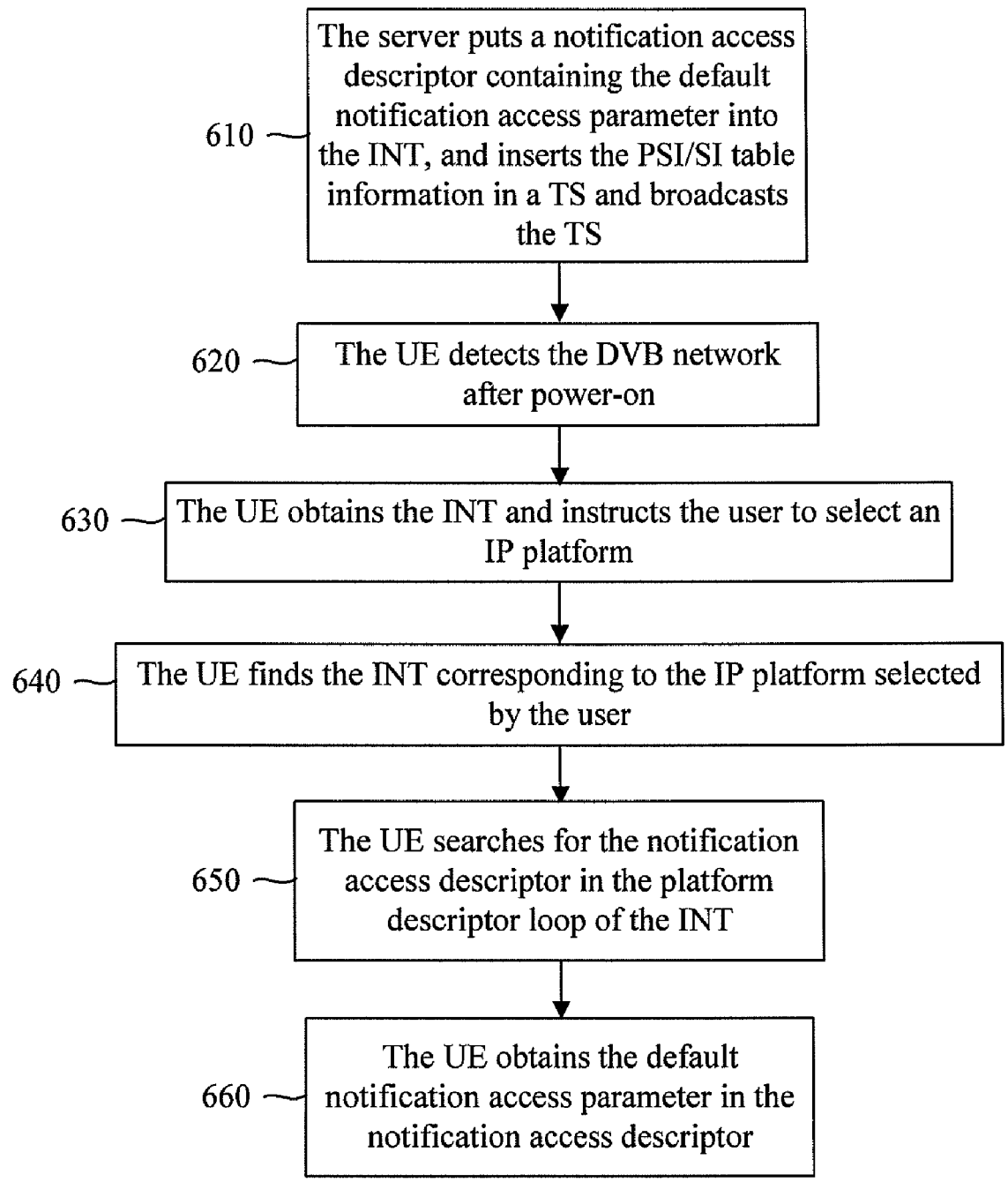
FIG. 6 is a schematic diagram for obtaining a default notification message in accordance with a third embodiment of the present disclosure.

In the above description of FIG. 4 and FIG. 5, the NotificationEntry is carried in the default notification discovery descriptor that is newly added to the bootstrap ESG. Because there is one ESG provider, the data structure carried in the bootstrap ESG can correspond to the default notification service provided by the service provider (IT platform). In practice, a notification access descriptor may be added to the platform descriptor loop of the INT, and the NotificationEntry is carried in the newly-added notification access descriptor so that the UE can obtain the NotificationEntry and further obtain the default notification message. The procedure of this method for obtaining the default notification message is illustrated by FIG. 6, including the following Blocks:

Block 610: The server puts a notification access descriptor containing the default notification access parameter into an INT and inserts the PSI/SI table information that contains the INT into a TS and broadcasts the TS.

Block 620: After the UE is powered on, the UE can detect and access the DVB network by using the conventional art.

Block 630: After accessing the DVB network, the UE may receive the INT from the server. Then, the UE generates an instruction instructing the user to select an IP platform.

Block 640: After receiving the IP platform selected by the user, the UE may find the INT corresponding to the user-selected IP platform among all the INTs by using the conventional art.

Block 650: The UE searches for the notification access descriptor in the platform descriptor loop of the INT corresponding to the user-selected IP platform.

Block 660: The UE reads the NotificationEntry in the notification access descriptor and then may obtain the corresponding default notification message at the location indicated by the NotificationEntry. Because the INT provided by the BCAST service provider is unique, the default notification access descriptor in the INT may correspond to the default notification service. The specific method for obtaining the default notification message is the same as that illustrated with reference to FIG. 2.

Main fields contained in the INT are shown in Table 2:

TABLE 2

| Parameter | Bits | Data Type |
| --- | --- | --- |
| IP/MAC_notification_section() { | | |
| table_id | 8 | Integer |
| section_syntax_indicator | 1 | Character string |
| Reserved_for_future_use | 1 | Character string |
| Reserved | 2 | Character string |
| section_length | 12 | |
| action_type | 8 | Integer |
| Platform_id_hash | 8 | Integer |
| Reserved | 2 | Character string |
| version_number | 5 | Integer |
| current_next_indicator | 1 | Character string |
| section_number | 8 | Integer |
| last_section_number | 8 | Integer |
| Platform_id | 24 | Integer |
| processing_order | 8 | Integer |
| Platform_descriptor_loop() | | |
| for (i=0, i<N1, i++) { | | |
| target_descriptor_loop() | | |
| operational_descriptor_loop() | | |
| } | | |
| CRC_32 | 32 | Remainder multinomial coefficient |
| } | | |

The meanings of the above main fields contained in the INT are as follows:

table_id: set to 0x4C, uniquely defining the INT.

section_syntax_indicator: 1-bit field, set to "1".

reserved_for_future_use: bits that are unused, undefined.

reserved: 1-bit field, reserved for use.

section_length: 12-bit field, the first two bits of which are set to "00". It indicates the byte length of the section starting from a next byte of the field including CRC. section_length shall not be larger than 1012 so the maximum length of the section is 1024 bytes.

section_length: 12-bit field, the first two bits of which are set to "00". It indicates the byte length of the section starting from a next byte of the field including CRC. section_length shall not be larger than 4093 so the maximum length of the section is 4096 bytes.

action_type: action type indicator, 8-bit field, indicating the action to be performed. When action_type is set to 0x01, it locates the IP stream in the DVB network.

platform_id_hash: the hash value of the platform ID, obtained after an EXCLUSIVE-OR operation is performed on three bytes of platform_id (platform_id_hash=platform_id_hash[23..16]^platform_id_hash[15..8]^platform_id_hash[7..0]).

reserved: 2-bit field, reserved for use.

version_number: 5-bit field, identifying the version number of a subtable. When the information contained in the subtable changes, 1 is added to the version number. When the version number reaches 31, it is reset to 0. When current_next_indicator is set to 1, version_number is the version number of the currently used subtable defined by table_id, platform_id, and action_type. When current_next_indicator is set to 0, version_number is the version number of the subtable to be used next defined by table_id, platform_id, and action_type.

current_next_indicator: 1-bit indicator. When current_next_indicator is set to 1, it indicates that the current subtable is being used. When current_next_indicator is set to 0, it indicates that the subtable being transmitted has not been used and will be used next.

section_number: 8-bit field, indicating the number of a section. The section number of the first section of the subtable is set to 0x00. Each time a section containing the same table_id and bouquet_id is added, 1 is added to the section number.

last_section_number: 8-bit field, indicating the section number of the last section of the subtable, where the last section has the largest section number.

processing_order: indicating the priority of actions. If the INT needs multiple actions, processing_oder indicates the order of the actions. Likewise, if a platform has more than one INT subtable, processing_ord indicates the priority of the subtables.

CRC_32: 32-bit cyclic redundancy check, 32-bit, including the CRC value.

platform_descriptor_loop: providing information about a platform.

target_descriptor_loop: providing valid target equipment information for operational_descriptor loop.

operational_descriptor_loop: providing the equipment operation information which meets the target_descriptor_loop requirement.

The data structure of platform_descriptor_loop to which the notification access descriptor is added is shown in Table 3:

TABLE 3

| Parameter | Data Type | Meaning |
|---|---|---|
| platform_descriptor_loop( ){ | | Describes an IP platform. |
| reserved | Character string | 4-bit field, reserved for use. |
| platform_descriptor_loop_length | Integer | Indicates the length of bytes occupied by platform_descriptor_loop. |
| notification access descriptor( ) | | Indicates the default notification access parameter of the platform. |
| for(i=0;i<N1;i++) | | |
| platform_descriptor( ) | | Indicates other information about the platform. |
| } | | |

The data structure of the notification access descriptor is shown in Table 4.

TABLE 4

| Parameter | Data Type | Meaning |
|---|---|---|
| descriptor_tag | Integer | Indicates the type of the descriptor. |
| descriptor_length | Integer | Indicates how many bytes the descriptor occupies. |
| Notification AccessPort | Integer | Indicates the IP port number used for sending the default notification message. |
| NotificationAccessAddress | Integer | Indicates the IP multicast address used for sending the default notification message. |
| NotificationRequestAccessURL | Character string | According to this location information, the UE can obtain the default notification message through the Internet. |
| } | | |

Figure 7:
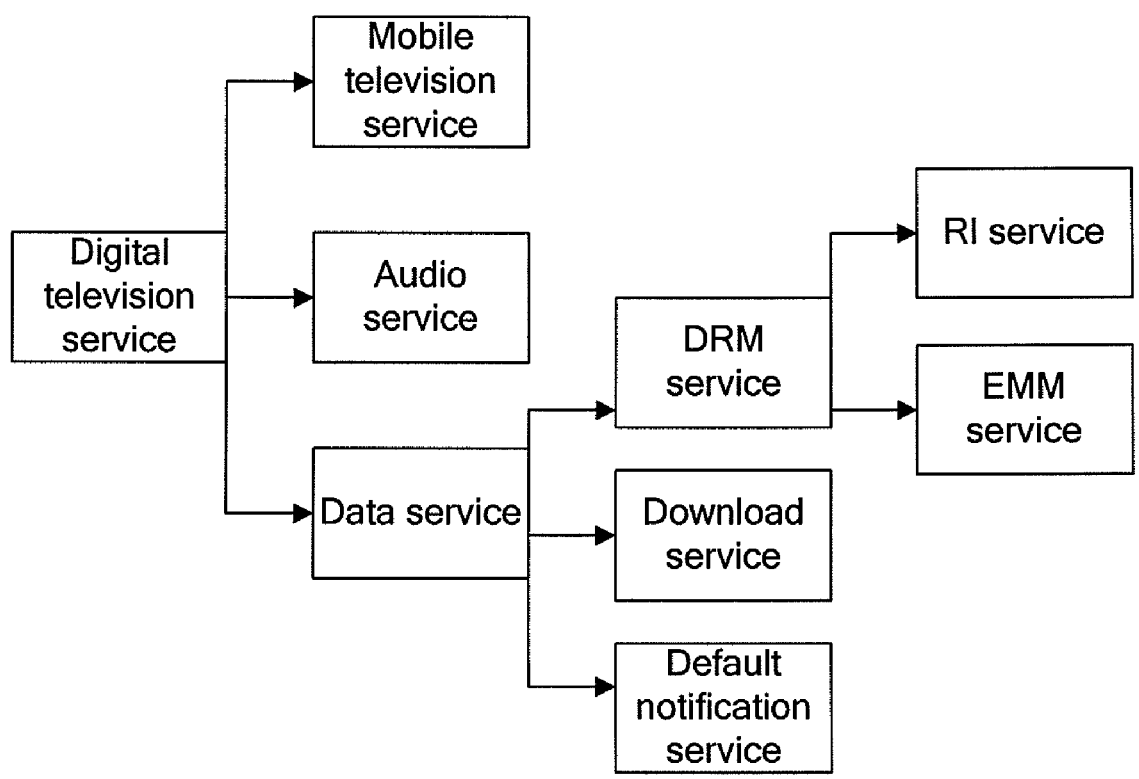
FIG. 7 is a schematic diagram for adding a default notification service in the digital television service.

In the above description, the server puts the default notification access parameter into the descriptor and sends it to the UE. In practice, the server may also take the default notification message as a new special service of the digital television service, as shown in FIG. 7: adding a default notification service in the current digital television services such as the audio service. Based on the new default notification service, the server can send the default notification access parameter to the UE.

Specifically, the following content may be added to a service fragment.

```
<ServiceTable>
  <Service serviceID="cbms://service/Notification">
    <ServiceName>default notification service</ServiceName>
    <ServiceType href="urn:dvb:ipdc:esg:cs:ServiceTypeCS:1.3.3"/>
    <AcquisitionRef IDRef="cbms://service/Acquisition/Channel1"/>
  </Service>
</ServiceTable>
```

In the above content, the service type of the default notification service is provisionally set to 1.3.3.

The above content newly added to the service fragment can be recognized by both the server and the UE so that when the UE receives the service fragment from the server. The UE can determine based on the above new content that the server provides the default notification service. Actually, the content newly added to the service fragment may be called a default notification service ID.

Figure 8:
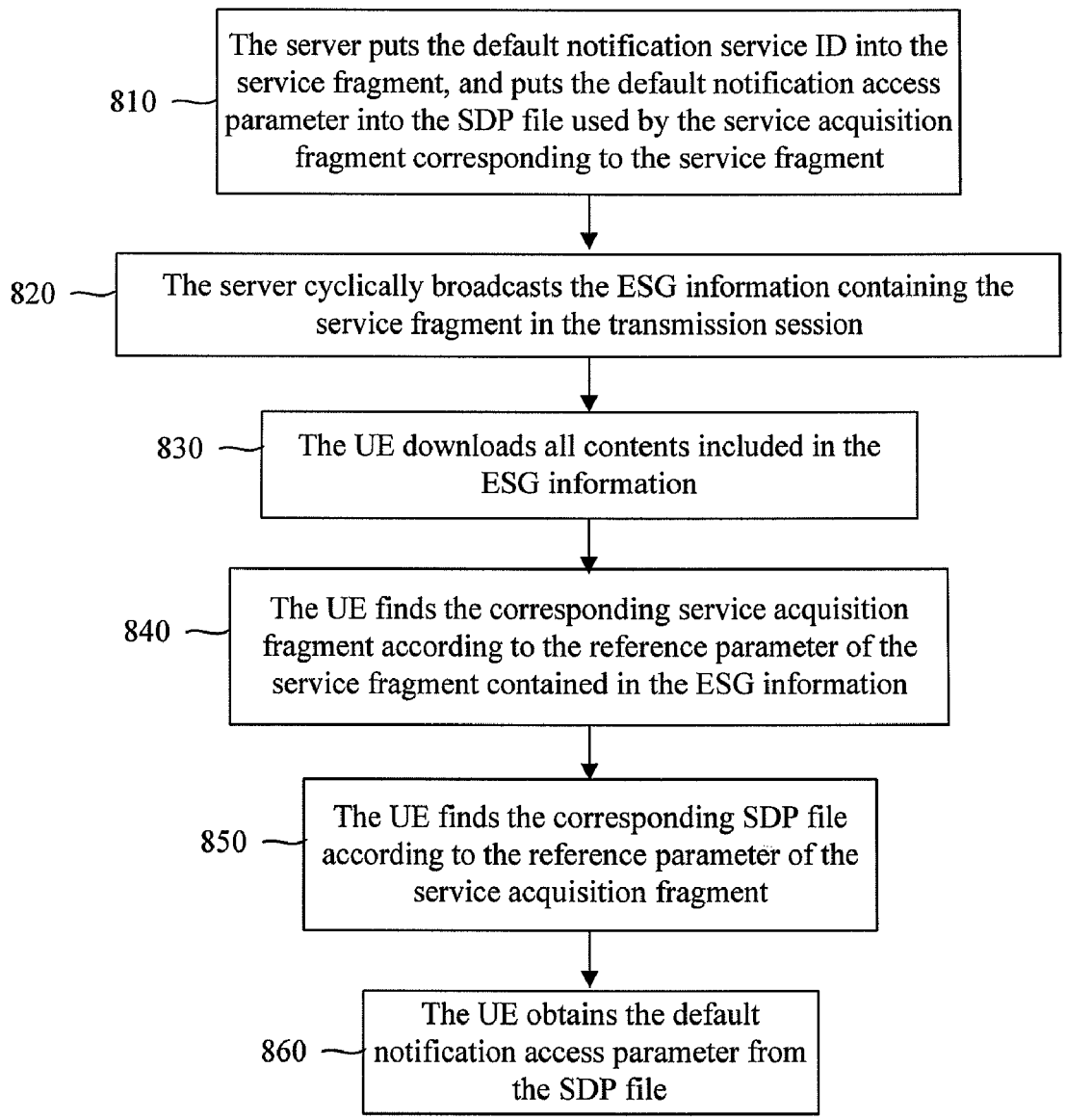
FIG. 8 is a flowchart for obtaining a default notification message in accordance with a fourth embodiment of the present disclosure.

It can be seen that when the UE receives the service content of the default notification service from the server, the UE can obtain the NotificationEntry contained in the service content and then obtain the corresponding default notification message at the location indicated by the NotificationEntry. The procedure for obtaining the default notification message in this way is shown in FIG. 8, including:

Block 810: The server puts the default notification service ID that can be recognized by the UE into the service fragment to be sent to the UE so that when the UE receives the service fragment, the UE can determine that the server provides the default notification service according to the default notification service ID contained in the service fragment. The server also puts the NotificationEntry into the SDP file of the service acquisition fragment corresponding to the service fragment.

Block 820: The server broadcasts the ESG information containing the service fragment. The specific method for broadcasting the ESG information is that the server cyclically broadcasts the ESG information in the transmission session.

Block 830: The UE downloads all contents contained in the ESG information sent by the server including the service fragment to be sent to the UE.

Block 840: The UE finds the corresponding service acquisition fragment according to the reference parameter of the service fragment contained in the ESG information by using the conventional art.

Block 850: The UE finds the corresponding SDP file according to the reference parameter of the service acquisition fragment by using the conventional art.

Block 860: The UE reads the NotificationEntry from the SDP file and then obtains the corresponding default notification message at the location indicated by the NotificationEntry. It can be seen that through the default notification service ID, the SDP file can correspond to the default notification service. The specific method for obtaining the default notification message is the same as that illustrated with reference to FIG. 2.

It can be seen from the above description that the unique NotificationEntry can be sent to the UE in many ways. For example, the NotificationEntry is carried in the ESG provider descriptor of the bootstrap ESC, and sent with the bootstrap ESG to the UE, or the NotificationEntry is carried in the default notification discovery descriptor newly added in the bootstrap ESQ and sent to the UE, or a notification access descriptor containing the NotificationEntry is added to the platform_descriptor_loop of the INT and sent with the INT to the UE, or the NotificationEntry is taken as the service content of a new special service of the digital television service and sent to the UE.

No matter in which mode the NotificationEntry is sent to the UE, the UE can successfully obtain the NotificationEntry and then obtain the corresponding default notification message at the location indicated by the NotificationEntry.

From the above description of FIG. 2 to FIG. 8, it can be seen that the method for obtaining the default notification message provided by the embodiments of the disclosure may be applied to the DVB-H system. The server and the UE are a server and a UE respectively in the DVB-H system. Moreover, the description of FIG. 2 to FIG. 8 can be summarized to the procedure illustrated in FIG. 9.

Figure 9:
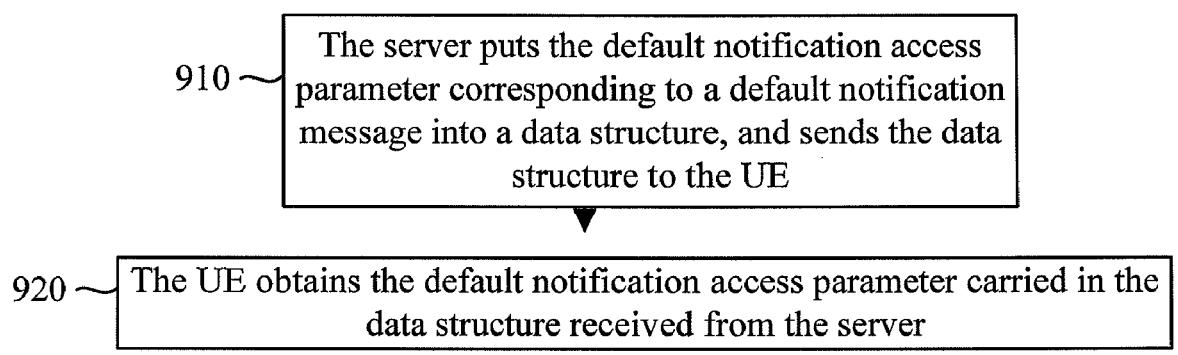
FIG. 9 is a simple flowchart for obtaining a default notification message in accordance with the present disclosure.

FIG. 9 is a simple flowchart for obtaining a default notification message according to the present disclosure. The procedure includes the following Blocks:

Block 910: The server puts the default notification access parameter corresponding to a default notification message into a data structure and sends the data structure to the UE.

Block 920: The server obtains the default notification access parameter from the data structure sent by the server.

The UE may further obtain the corresponding default notification message at the location indicated by the defaulted Notification Access Parameter.

Figure 10:
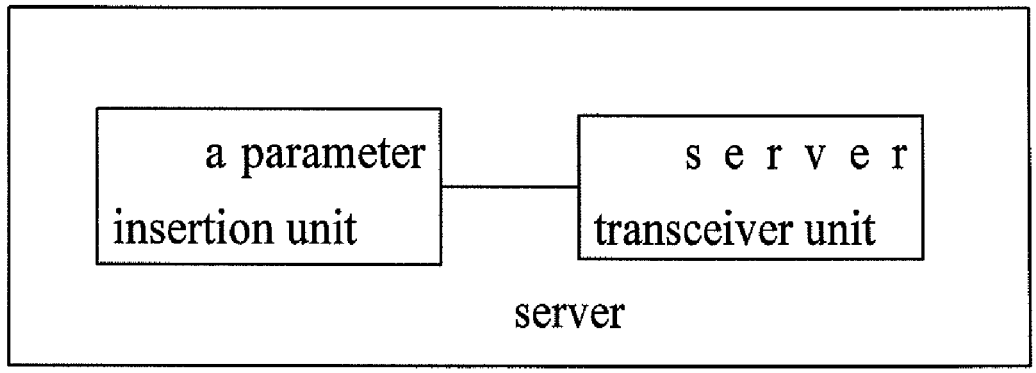
FIG. 10 simply shows the structure of an embodiment of the server for obtaining a default notification message.

Actually, as shown in FIG. 10, the server may include a parameter insertion unit which is connected to a server transceiver unit in the server. In practice, the default notification access parameter corresponding to the default notification message is put into the data structure by the parameter insertion unit and the data structure corresponds to the default notification service. The parameter insertion unit sends the data structure carrying the default notification access parameter to the server transceiver unit, and the server transceiver unit sends the data structure to the UE.

Figure 11:
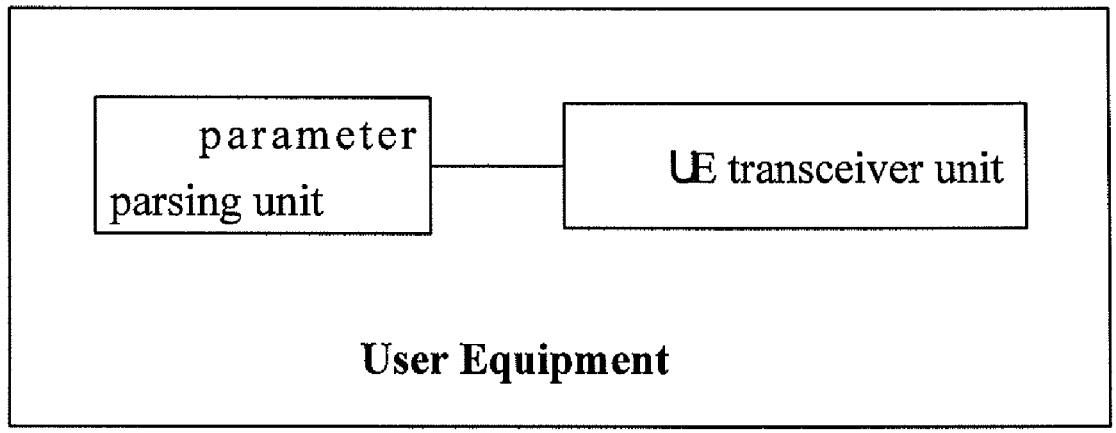
FIG. 11 simply shows the structure of an embodiment of the User Equipment for obtaining a default notification message.

In addition, as shown in FIG. 11, the UE may include a parameter parsing unit which is connected to a UE transceiver unit in the UE. In practice, the UE transceiver unit receives the data structure from the server and then sends the received data structure to the parameter parsing unit, where the data structure corresponds to the default notification service. The parameter parsing unit parses out the default notification access parameter contained in the data structure by reading or in other modes. The parameter parsing unit may further obtain the default notification message according to the parsed default notification access parameter.

It can be seen from the above description that the method, server, and UE for obtaining a default notification message provided by the embodiments of the present disclosure can make a UE to obtain a unique default notification access parameter in a DVB-H system and then to obtain a default notification message according to the access parameter. Besides, because the default notification access parameter obtained by the UE is unique, the embodiments overcome the problem that the default notification access parameters are inconsistent in the conventional art and no data redundancy will be caused in the UE.

What is claimed is:

1. A method for obtaining a default notification message in a Digital Video Broadcasting handheld, DVB-H, system comprising:
obtaining, by a User Equipment (UE), a data structure containing a default notification access parameter corresponding to a default notification message, the data structure being a default notification discovery descriptor which is added to a bootstrap Electronic Service Guide (ESG);
parsing out, by the UE, the default notification access parameter from the default notification discovery descriptor added to the bootstrap ESG; and obtaining, by the UE, the default notification message according to the default notification access parameter;
wherein the default notification discovery descriptor carries a unique default NotificationEntry that comprises the default notification access parameter.

2. A method for obtaining a default notification message in a Digital Video Broadcasting handheld, DVB-H, system comprising:
obtaining, by a User Equipment (UE), a data structure containing a default notification access parameter corresponding to a default notification message, the data structure being an Electronic Service Guide (ESG) provider descriptor which is included in a bootstrap ESG;
parsing out, by the UE, the default notification access parameter from the ESG provider descriptor included in the bootstrap ESG; and obtaining, by the UE, the default notification message according to the default notification access parameter;
wherein the ESG provider descriptor carries a unique default NotificationEntry that comprises the default notification access parameter.

3. The method of claim 2, wherein, the obtaining a data structure comprises: obtaining an Elementary Stream (ES) transmitting the bootstrap ESG at a address well known by a server broadcasting the bootstrap ESG and the UE;
obtaining all descriptors of the bootstrap ESG from the ES; and
reading a descriptor carrying the default notification access parameter corresponding to the default notification message.

4. The method of claim 1, wherein, the obtaining a data structure comprises: obtaining an Elementary Stream (ES) transmitting the bootstrap ESG at an address well known by a server broadcasting the bootstrap ESG and the UE;
obtaining all descriptors of the bootstrap ESG from the ES; and
reading a descriptor carrying the default notification access parameter corresponding to the default notification message.

5. The method of claim 1, wherein the default notification access parameter comprises at least one of an Internet Protocol (IP) address and a port number; and
the obtaining the default notification message comprises:
monitoring the information sent to the at least one of the IP address and the port number that is set as the default notification access parameter; and
intercepting the default notification message when the default notification message is sent to the at least one of the IP address and the port number.

6. A server for obtaining a default notification message in a Digital Video Broadcasting handheld, DVB-H, system, comprising:
a processor; and
a parameter insertion unit, adapted to instruct the processor to put a default notification access parameter corresponding to a default notification message into a data structure and send the data structure to a server transceiver unit, the data structure being a default notification discovery descriptor which is added to a bootstrap ESG or an Electronic Service Guide (ESG) provider descriptor included in a bootstrap ESG, wherein the default notification discovery descriptor carries a unique default NotificationEntry that comprises the default notification access parameter;

the server transceiver unit, adapted to instruct the processor to send the data structure, which is received from the parameter insertion unit, to a User Equipment (UE).

7. A User Equipment (UE) for obtaining a default notification message in a Digital Video Broadcasting handheld, DVB-H, system, comprising:
   a processor; and
   a UE transceiver unit adapted to instruct the processor to obtain a data structure which carries a unique default notification access parameter corresponding to a default notification message and send the data structure to a parameter parsing unit, the data structure being a default notification discovery descriptor which is added to a bootstrap Electronic Service Guide (ESG) or an ESG provider descriptor included in a bootstrap ESG, wherein a unique default NotificationEntry is carried in the default notification discovery descriptor added to the bootstrap ESG or the ESG provider descriptor included in a bootstrap ESG, and the NotificationEntry contains the default notification access parameter;
   wherein the parameter parsing unit is adapted to instruct the processor to obtain the default notification access parameter from the data structure received from the UE transceiver unit and obtain the default notification message according to the default notification access parameter.

8. A system for obtaining a default notification message in a Digital Video Broadcasting handheld, DVB-H, system, comprising:
   a server; and
   a User Equipment (UE),
   wherein the server is adapted to put a unique default notification access parameter corresponding to a default notification message into a data structure and send the data structure to the UE, the data structure being a default notification discovery descriptor which is added to a bootstrap Electronic Service Guide (ESG) or an ESG provider descriptor included in a bootstrap ESG, wherein the default notification discovery descriptor carries a unique default NotificationEntry that comprises the default notification access parameter;
   and the UE is adapted to receive the data structure, obtain the default notification access parameter from the data structure, and obtain the default notification message at a location indicated by the default notification access parameter.

9. A method for operating a default notification message in a Digital Video Broadcasting handheld, DVB-H, system, comprising:
   putting, by a server, a default notification access parameter corresponding to a default notification message into a data structure, the data structure being a default notification discovery descriptor which is added to a bootstrap Electronic Service Guide (ESG) or an ESG provider descriptor included in a bootstrap ESG, wherein the default notification discovery descriptor carries a unique default NotificationEntry that comprises the default notification access parameter; and
   sending, by the server, the data structure to a User Equipment (UE).

10. One or more non-transitory computer readable media, comprising logic encoded in the computer readable media, the logic when executed operable to implement the method comprising:
   obtaining a data structure containing a default notification access parameter corresponding to a default notification message, the data structure being a default notification discovery descriptor which is added to a bootstrap Electronic Service Guide (ESG) or an ESG provider descriptor included in a bootstrap ESG, wherein the default notification discovery descriptor carries a unique default NotificationEntry that comprises the default notification access parameter;
   parsing out the default notification access parameter from the data structure; and
   obtaining the default notification message at a location indicated by the default notification access parameter.

11. One or more non-transitory computer readable media, comprising logic encoded in the computer readable media, the logic when executed operable to implement the method comprising:
   putting a default notification access parameter corresponding to a default notification message into a data structure, the data structure being a default notification discovery descriptor which is added to a bootstrap Electronic Service Guide (ESG) or an ESG provider descriptor included in a bootstrap ESG, wherein the default notification discovery descriptor carries a unique default NotificationEntry that comprises the default notification access parameter; and
   sending the data structure to a User Equipment (UE).

* * * * *